Feb. 16, 1960 T. J. BROWNRIGG 2,925,082
COOKING UTENSIL ATTACHMENT
Filed Feb. 17, 1956

Thomas J. Brownrigg
INVENTOR.

BY *[signatures]*
Attorneys

United States Patent Office 2,925,082
Patented Feb. 16, 1960

2,925,082
COOKING UTENSIL ATTACHMENT
Thomas J. Brownrigg, Hollywood, Fla.

Application February 17, 1956, Serial No. 566,203

1 Claim. (Cl. 126—383)

The present invention relates to an attachment for domestic and commercial cooking utensils and vats and has for its primary object to provide, in a manner as hereinafter set forth, novel means for preventing fluids in such utensils and vats from boiling over.

Another very important object if the invention is to provide an attachment of the aforementioned character which may be readily mounted for use on various types, sizes and shapes of cooking utensils and vats and removed therefrom when desired.

Other objects of the invention are to provide a cooking utensil attachment of the character described which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
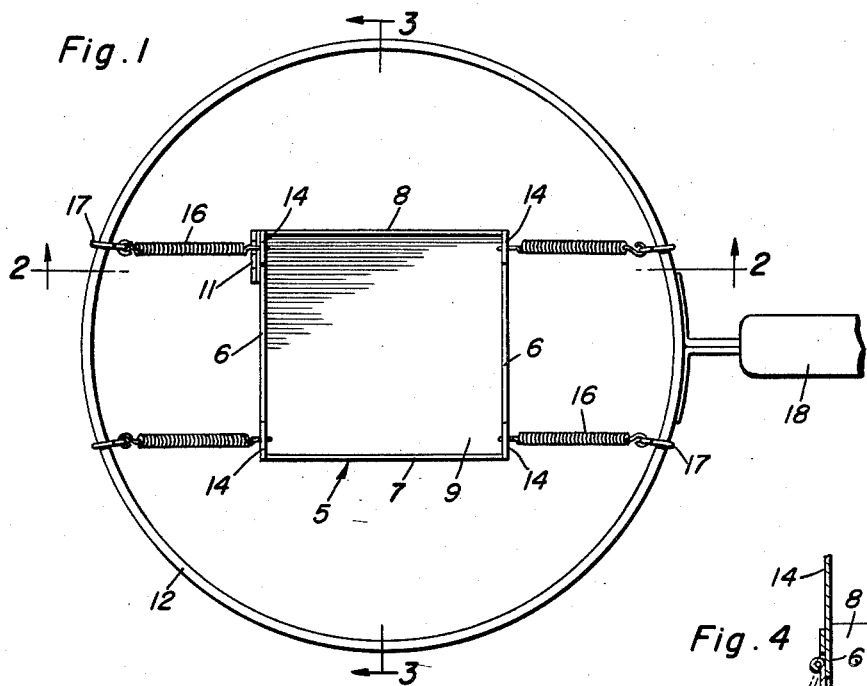
Figure 1 is a top plan view, showing an attachment constructed in accordance with the present invention mounted for use on a cooking utensil.
Figure 4:
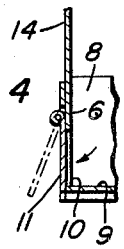
Figure 2:
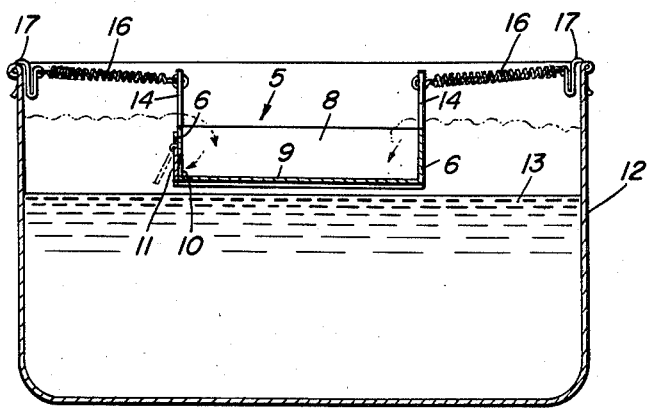
Figure 2 is a vertical sectional view, taken substantially on the line 2—2 of Figure 1.
Figure 3:
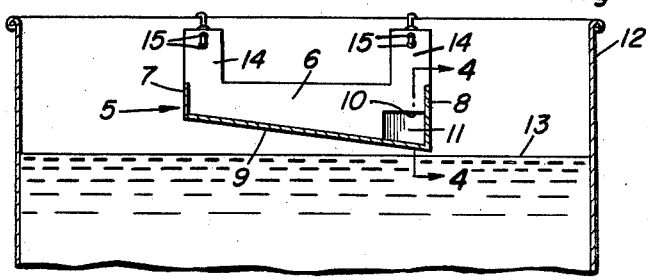
Figure 3 is a fragmentary view in vertical section, taken substantially on the line 3—3 of Figure 1; and, Figure 4 is a fragmentary view in vertical section through the device, taken substantially on the line 4—4 of Figure 3.

Referring now to the drawing in detail, it will be seen that the embodiment of the invention which has been illustrated comprises a receptacle or pan of suitable dimensions and material which is designated generally by reference character 5. The pan 5 may be substantially square in plan, as shown, or of any other desired shape.

The pan 5 includes side walls 6, end walls 7 and 8 and an inclined bottom 9. One of the side walls 6 is provided, immediately adjacent the end wall 8, with a discharge or outlet opening 10 which is controlled by a hinged check valve 11 of the flap-type.

The pan 5 is adapted to be suspended in a conventional cooking utensil, as indicated at 12, above the level of the liquid 13 therein. Toward this end, integral arms 14 rise from the end portions of the side walls 6 of the pan 5. The upper portions of the arms 14 are apertured, as indicated at 15, to facilitate connecting thereto one end of a plurality of supporting coil springs 16. Hooks 17 are connected to the other ends of the coil springs 16 for engagement over the top portion of the utensil 12 for suspending the pan 5 therein with said springs under slight tension. As will be seen, when the pan 5 is thus suspended, said pan and the springs 16 assume the form of a catenary.

It is thought that the operation or use of the device will be readily apparent from a consideration of the foregoing. Briefly, the hooks 17 on the free or outer ends of the coil springs 16 are engaged over the top portion of the utensil 12 for supporting the pan 5 therein above the level of the liquid 13. Should the liquid 13 boil excessively it will spill into the pan 5 over the top thereof instead of boiling over the top of the utensil 12. The boiling liquid flows by gravity down the inclined bottom 9 of the pan 5 and returns in an obvious manner to the utensil 12 through the discharge opening 10 past the check valve 11. The construction and arrangement of parts is such that the device may be readily mounted in utensils or receptacles of various types, sizes and shapes. Reference character 18 designates a handle on the utensil 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

An attachment for suspension in the upper portion of a cooking utensil to prevent liquid from boiling over out of the utensil, said attachment comprising a rectangular pan having side and end walls and a bottom inclining downwardly from one end wall to the other, a pair of arms rising from each side wall adjacent the end walls, suspension springs for said pan having one end attached to upper portions of said arms and provided with terminal utensil rim engaging hooks, and means on one side wall of said pan for draining the pan at said other end wall.

References Cited in the file of this patent
UNITED STATES PATENTS

| | | |
|---|---|---|
| 211,014 | Hensel | Dec. 17, 1878 |
| 377,306 | Illoway | Jan. 31, 1888 |
| 556,417 | Hoppner et al. | Mar. 17, 1896 |
| 948,994 | Howland | Feb. 15, 1910 |
| 1,429,783 | Scott | Sept. 19, 1922 |
| 1,554,501 | Horle et al. | Sept. 22, 1925 |
| 1,653,109 | Krietemeyer | Dec. 20, 1927 |
| 2,132,609 | Ellinger | Oct. 11, 1938 |
| 2,139,968 | McLachlan | Dec. 13, 1938 |
| 2,678,992 | Koch | May 18, 1954 |

FOREIGN PATENTS

| | | |
|---|---|---|
| 704,267 | France | Feb. 17, 1931 |